(No Model.) 3 Sheets—Sheet 1.
F. PARSONS.
SAW SHARPENING MACHINE.
No. 579,837. Patented Mar. 30, 1897.
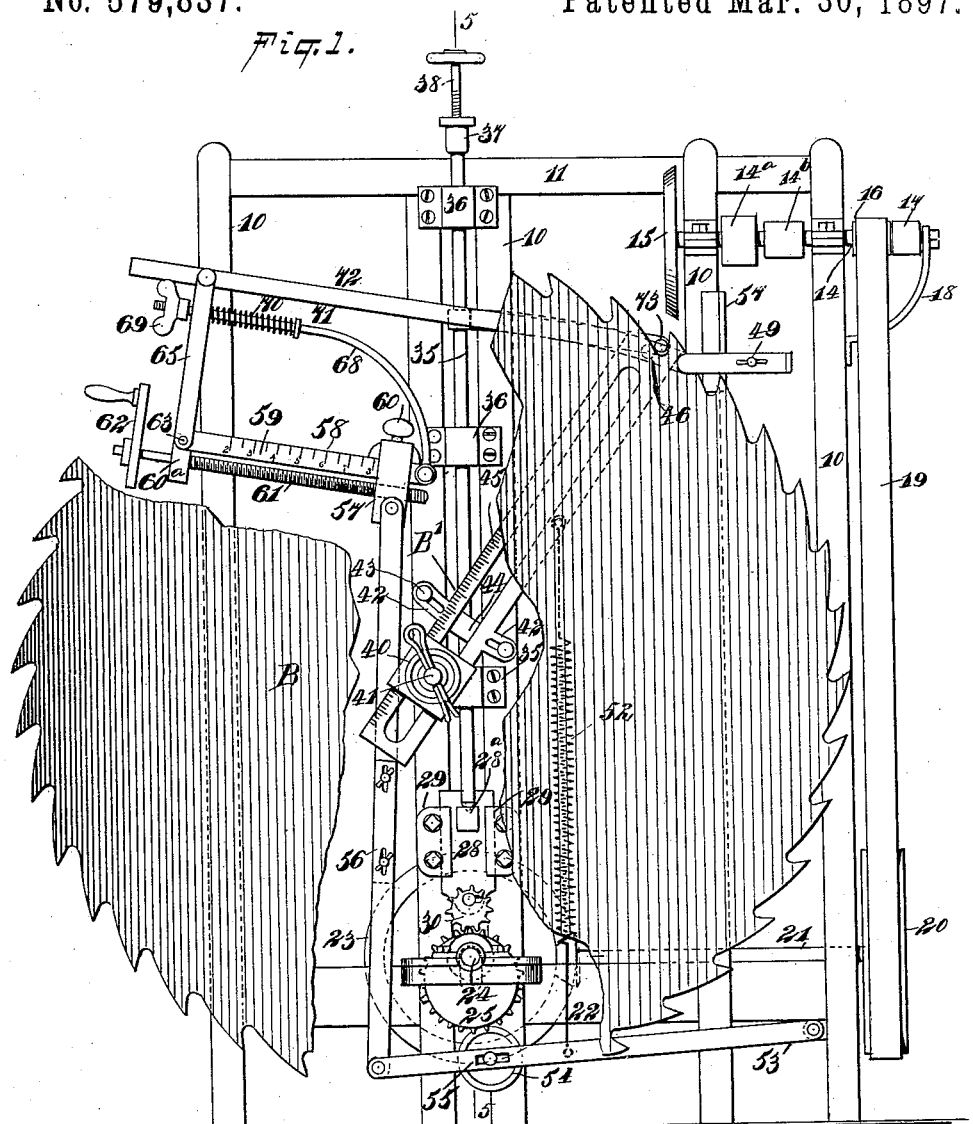
WITNESSES:
William P. Goebel.
INVENTOR
F. Parsons
BY
ATTORNEYS.

(No Model.) 3 Sheets—Sheet 2.

F. PARSONS.
SAW SHARPENING MACHINE.

No. 579,837. Patented Mar. 30, 1897.

WITNESSES: William P. Goebel, J. Fred. Acker.

INVENTOR F. Parsons BY Munn ATTORNEYS.

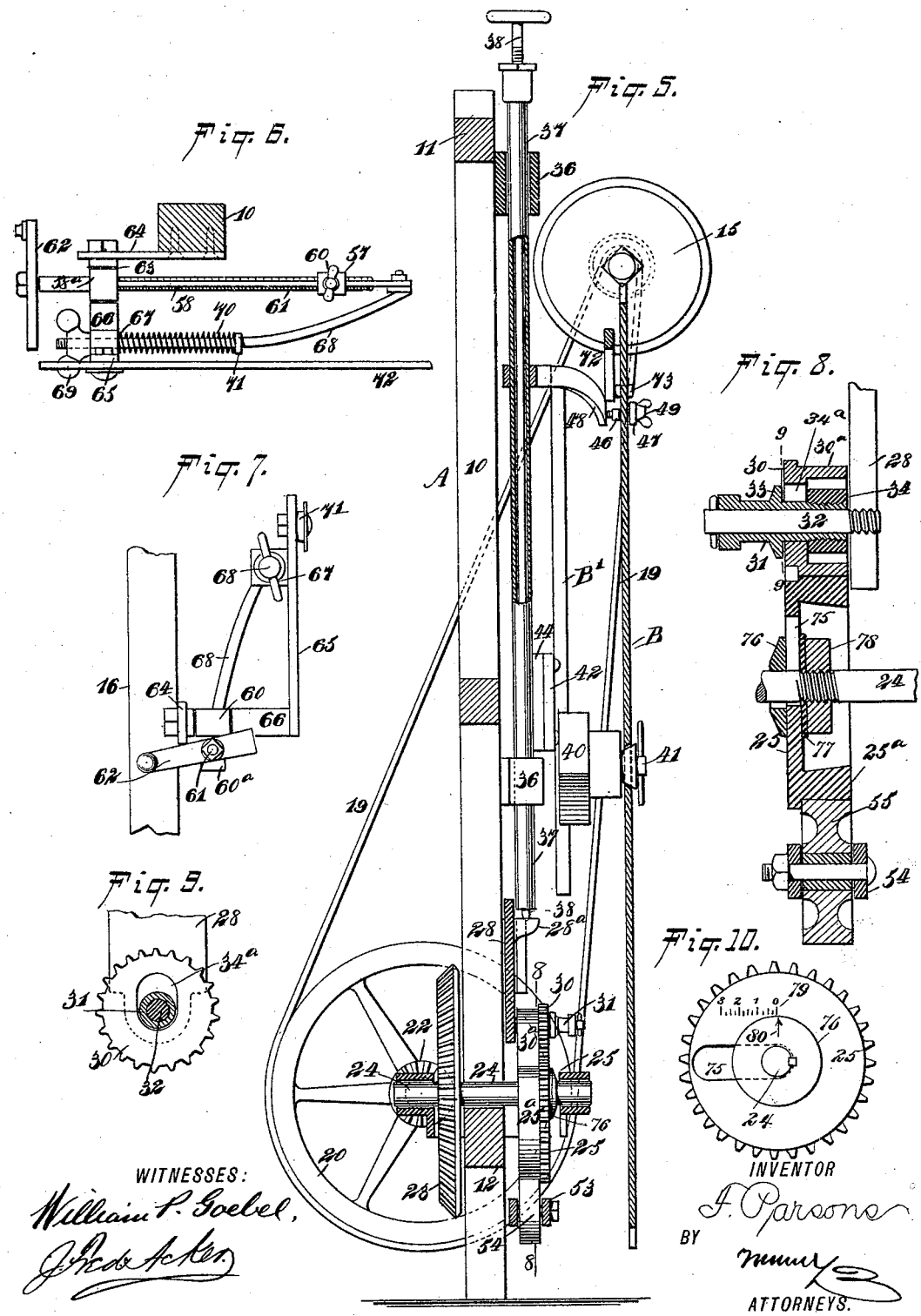

UNITED STATES PATENT OFFICE.

FRANK PARSONS, OF MONTGOMERY, MISSISSIPPI.

SAW-SHARPENING MACHINE.

SPECIFICATION forming part of Letters Patent No. 579,837, dated March 30, 1897.

Application filed July 3, 1896. Serial No. 597,958. (No model.)

*To all whom it may concern:*

Be it known that I, FRANK PARSONS, of Montgomery, in the county of Lincoln and State of Mississippi, have invented a new and Improved Saw-Sharpening Machine, of which the following is a full, clear, and exact description.

My invention relates to an improvement in machines for sharpening saws; and it has for its object to provide a machine which will be of exceedingly simple and durable construction and which may be successfully operated by any one of ordinary intelligence.

A further object of the invention is to so construct the machine that after the saw has once been placed thereon and sharpened such a record may be kept as to enable the saw to be conveniently and expeditiously placed in position upon the machine at any time.

Another object of the invention is to construct the machine in such manner that after the saw has once been placed in proper position the operation of sharpening and feeding the saw will be automatically accomplished.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
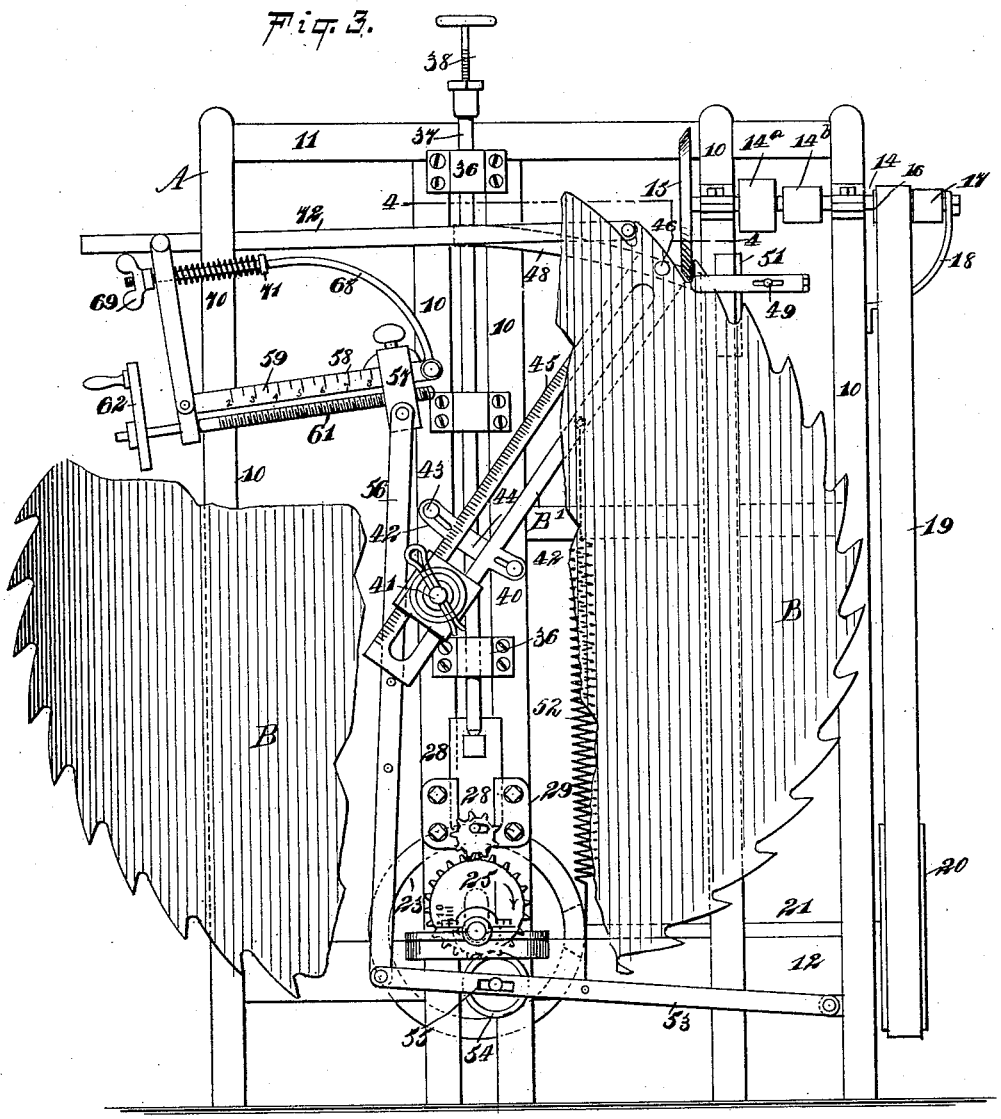
Figure 4:
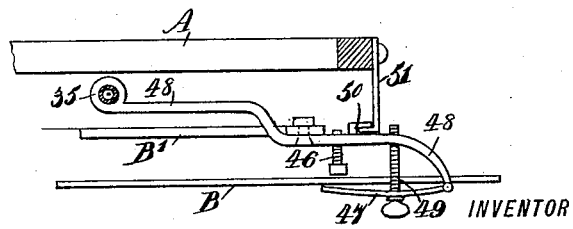

Figure 1 is a front elevation of the machine, the saw being attached to the machine and partly broken away to disclose the main operative parts of the machine and illustrating the feeding device as being operated on the saw. Fig. 2 is a plan view of the machine. Fig. 3 is a view similar to Fig. 1 in which the feeding device is in position to rotate the saw after the saw has been dropped from the emery-wheel in which it is shown as in engagement. Fig. 4 is a detail sectional view taken practically on the line 4 4 of Fig. 3, illustrating the clamping mechanism for the peripheral portion of the saw. Fig. 5 is a vertical section taken substantially on the line 5 5 of Fig. 1. Fig. 6 is a horizontal section through a portion of the machine-frame, illustrating the major portion of the feeding device in plan view. Fig. 7 is a side elevation of the main portion of the feeding device and a partial side elevation of the machine-frame. Fig. 8 is a vertical section taken substantially on the line 8 8 of Fig. 5. Fig. 9 is a front elevation of the upper eccentric-gear assisting in the control of the vertical movement of the saw, the hub of the said gear and the stud upon which it is mounted being shown in section, the said section being taken practically on the line 9 9 of Fig. 8; and Fig. 10 is a front elevation of the main eccentric controlling the rise and fall of the saw.

In carrying out the invention a frame A is employed, which consists usually, as shown in the drawings, of a suitable number of uprights 10, connected at the top by a cross-bar 11 and near the bottom by a cross-bar 12. In suitable bearings located near the top of preferably the two right-hand outer uprights 10 a shaft 14 is mounted to revolve, and upon the inner end of this shaft an emery-wheel 15 or its equivalent is securely fastened, while upon the outer end of the shaft a pulley 16 is secured, and an idler 17 is journaled upon an independent shaft supported by a bracket 18. The pulley 16 of the emery-wheel shaft is connected by a belt 19 with a large wheel 20, mounted upon a shaft 21, located at the bottom of the said frame and extending transversely thereof at one side to a point near the center, it being understood that the shaft 14 is provided with a fast and a loose pulley $14^a$ and $14^b$, to be connected with any suitable source of power. The lower shaft 21 has a beveled pinion 22 secured upon its inner end, which meshes with the teeth of a beveled gear 23, the latter being secured upon a short shaft 24, journaled in the bottom of the frame at a right angle to the shaft 21. The shaft 24 is provided with an eccentric 25, which eccentric has teeth upon its front marginal or peripheral surface, the rear peripheral or marginal surface $25^a$ being plain, and said eccentric is provided with means of adjustment in order that its throw may be varied at will. The eccentric may be adjusted as shown in Figs. 8 and 10, in which said eccentric has a slot 75 therein, extending outward from the center, the shaft 24 passing through said slot, and on the said shaft a collar 76 is keyed or otherwise secured, having a bearing against the front face of the eccentric, while a washer 77 on the shaft bears against the back face of the eccentric, and a lock-nut 78, screwed on the shaft, bears against the washer. A scale 79 is produced upon the front face of the eccentric, reading from the inner end outward. The scale is employed to regulate the adjustment of the eccentric and is read in connection with a pointer 80 on the collar 76.

Above the eccentric 25 a block or plate 28 or its equivalent has vertical movement in slideways 29, secured, preferably, upon the two central standards of the frame, the said standards being placed quite close together, and an eccentric 30, one-half of the diameter of the eccentric 25, is located over the latter, the said upper and smaller eccentric having teeth upon the front portion of its peripheral surface engaging with the teeth of the eccentric 25, the rear peripheral surface 30ᵃ being smooth, whereby the two eccentrics are compelled to operate in conjunction without danger of slipping. The upper and smaller eccentric 30 is mounted on a hub 31, which hub is held to revolve loosely on a stud 32, which is screwed or otherwise secured to the bottom portion of the slide or plate 28, as shown in Fig. 8. The hub is provided with a collar 33, engaging with the outer face of the upper and smaller eccentric 30, as is also shown in Fig. 8, and is adjustably held upon the hub with respect to its own center through the medium of a lock-nut 34, and the adjustment of the upper eccentric is accomplished by providing an elongated opening 34ᵃ in the web thereof, as shown in Figs. 8 and 9, the aforesaid collar and lock-nut 33 and 34 holding the upper eccentric in whatever position it may be placed. Since the upper eccentric 30 must be adjusted together with the main eccentric 25, a scale similar to that upon the main eccentric is provided for the smaller or upper one, except that as in this case the collar turns the lines are carried on across the web and read from the edge of the collar.

A hollow shaft 35 is loosely mounted above the sliding block or plate 28 in suitable bearings 36, attached to the frame. This shaft is provided at its upper end with a cap 37, and an adjusting-shaft 38 is passed through the hollow shaft 35, being made to extend outward through and beyond the bottom of the latter and engage with the top of the sliding block or plate 28, the latter preferably having a socket 28ᵃ formed thereon to receive the lower end of the said adjusting-shaft, and the upper portion of the adjusting-shaft 38 is threaded where it passes through the cap 37, so that by turning the shaft 38 the tubular shaft may be raised and lowered, and this adjustment is made as the diameter of the emery-wheel decreases and the character of the work may demand, since the saw B is supported by the said tubular shaft. Therefore the shaft will have vertical movement induced by the eccentric connection between the plate 28 and the driving-shaft 21, the upward and downward movement being designed to carry the saw to and from the emery-wheel 15.

A table B' is placed in an inclined or diagonal position across the tubular shaft 35, and the said table B' serves as a support for a chuck 40, which is adjustably secured on the table by means of a center pin 41, and the saw to be sharpened is placed upon this pin, being held in position on the chuck, for example, by means of a tapering plug, as shown in Fig. 5, and a cotter-pin or its equivalent. The table B' is provided with lugs 42, projected from its sides, the said lugs being slotted to receive pins 43, which pins, as shown in Figs. 1 and 3, adjustably secure the lugs 42 to equivalently-located lugs 44, projected from opposite sides of the shaft 35. In this manner the table may be given more or less of an inclination and secured when adjusted. A scale 45 in inches is preferably produced upon the table B' to facilitate an accurate adjustment of the table at any desired angle relative to the shaft 35.

The table is particularly employed to regulate the grinding of the cutting-angle of the front of the teeth of the saw, and to that end may be held at a greater or a less angle to the line of motion. The adjusting devices of the table are of such character that the chuck 40 may be accurately placed and secured before it is encumbered with the weight of the saw, avoiding also any subsequent adjustment.

The peripheral portion of the saw is held in position to be ground through the medium of a clamp 47. (Shown particularly in Fig. 4.) This clamp engages with the front face of the saw and has a hinge connection with an arm 48, located mainly at the back of the saw and attached to the tubular shaft 35, controlling the upward movement of the saw, and a set-screw 49 or a like device is passed through the clamp 47 into its supporting-arm 48, to regulate the tension of the clamp on the outer face of the saw and cause the inner face of the saw to bear more or less firmly against a rest-pin 46, secured upon the aforesaid clamp-arm 48. Thus it will be observed that the clamp moves upward and downward with the vertical feed-shaft 35 of the saw, and in order that the vertical movement of the clamp-arm 48 may be guided a bracket 50 is secured upon the rear face of the clamping-arm 48, which engages with a guide-bracket 51, secured to the frame of the machine, as is also best shown in Fig. 4.

The feeding device is constructed in the following manner: A lever 53 is pivotally attached to one side of the bottom portion of the frame, and the said lever is carried beneath the lower eccentric 25, as shown in Figs. 1 and 3, and is provided with a tension-wheel 54, which is adjustable by being mounted in a longitudinal opening 55 in the said lever, and the aforesaid friction-wheel is held normally in engagement with the eccentric 25 by means of a spring 52, which is attached, preferably, to the table B' and to the aforesaid lever 53 between its fulcrum and the aforesaid friction-wheel, and a connecting-bar 56 is pivotally attached to the inner end of the lever 53, and the said connecting-bar is usually made in adjustable sections, the upper end of the connecting-bar being attached to a slide 57, which has movement upon a horizontal lever 58, having a scale 59 in inches produced upon its outer face, and the slide 57 may be secured upon the scale-lever 58 at any point by means of a set-screw 60.

A screw 61 is passed through the lower portion of the slide 57, being located beneath the scale-lever 59, and the outer end of the said screw is plain and is held to turn in a bracket $60^a$, which is projected downward from a sleeve $58^a$, attached to the fulcrum end of the scale-lever 58, and a crank-handle 62 or its equivalent is secured to the outer end of the screw, and through the medium of this screw the slide 57 may be drawn to any desired point on the scale of the aforesaid lever 58. The sleeve $58^a$ of the scale-lever is mounted to turn upon a stud 63, which is secured to a bracket-arm 64, attached to an outer upright of the frame, as illustrated in Figs. 6 and 7, and a second lever 65, provided with a sleeve 66, is mounted to turn upon the forward end portion of the aforesaid stud 63, and the lever 65 near its upper end has a socket 67 formed upon its back, through which a brace-bar 68 is loosely passed, having its outer end threaded and being provided at that point with an adjusting-screw 69, while the inner end of the brace-bar is pivotally connected with the inner extremity of the scale-lever 58.

A spring 70 is coiled around the brace-bar 68, having bearing against the socket 67 of the upright lever 65, which is at an angle to the scale-lever, and the said spring has likewise a bearing against a collar 71, formed upon the aforesaid brace-bar 68. A feed-bar 72 is pivotally connected with the upper end of the upright lever 65, and the said feed-bar is carried inwardly and terminates at its inner end in a stud or pin 73, adapted to enter between the teeth of the saw. The throw of the feed-lever is controlled mainly by the adjustment of the slide 57 on the scale-lever 58, so that when a proper throw is obtained a record may be made of the same by means of the scale on the lever 58 and preserved, together with the vertical adjustment of the saw described by the scale on the table B', and a record of the upper throw necessary for the saw may be preserved by the reading of the scales on the eccentrics 25 and 30, since by the adjustment of these eccentrics relative to one another the upward and downward throw of the saw will be obtained or determined, as heretofore stated, so that when a saw of a given diameter is to be placed on the machine an exact adjustment of the several parts necessary for the proper filing of that particular saw may be obtained by consulting the records of the adjustments. In the operation of this portion of the device, upon the downward movement of the tubular shaft 35, carrying the saw, the eccentric 25 will act on the roller 54 of the lower lever 53 and depress the latter, and through the medium of the connecting-strap 56 the levers 58 and 65, connected by the brace 68, will be drawn inward, carrying the feed-bar 72 in the same direction and causing the rotation of the saw to a greater or less degree, according to the position that the slide 57 occupies on the scale-lever. The spring 52, or a weight if substituted for the spring, acts on the lever 53 in a manner to keep the roller 54 always in engagement with the eccentric 25, and serves, in connection with the spring 70, to carry the feed-bar outward to engage with another tooth while the saw is being carried upward to the emery-wheel, as illustrated in Fig. 3.

The lower lever 53 is slotted in order to permit the roller 54 to adjust itself, which adjustment will bring the smaller diameter of the eccentric 25 in contact with the roller 54 before the larger diameter has arrived at its greatest upward throw. As the down motion of the lower lever 53 commences when the smaller diameter of the eccentric engages therewith, this arrangement will cause the feed-bar 72 to start in advance of the down motion of the saw, taking up any lost motion resulting from overthrow of the aforesaid feed-bar, and if the roller 54 is moved still farther from the vertical line above stated the saw will be rotated before the down motion begins and the gullet of the saw will be enlarged to provide greater dust-room.

Supposing the saw in the drawings to be sufficiently ground on the front of the tooth, but not enough on the back, a slight turn on the nut 69, controlling the spring 70 of the upper levers of the feed mechanism, will compress the said spring and carry the upwardly-extending lever 65 forward, pushing the face of the tooth a little past the emery-wheel, stopping the grinding on the face of the tooth and at the same time increasing it at the back of the same. A reverse turn of the nut 69 would increase the grinding action on the face and diminish it on the back of the tooth.

In order to stop the machine to place a saw in position thereon or to remove a saw, the belt 19 is shifted to the independent idler 17, whereupon the various parts of the machine will be silenced, and the saw-carrying shaft is manipulated through the medium of the adjusting-shaft 38 to lower the saw from the emery-wheel and admit of its being removed.

In further explanation of the operation of the machine the following may be offered: Suppose the eccentric 25 to be rigidly fixed on the shaft 24 with that amount of throw that would grind a tooth one inch deep, and that the block 57 is rigidly secured upon the scale-lever 58 in that position that would give three inches of motion to the feed-bar 72, and, furthermore, suppose that the saw-table B' is fixed at thirty-eight degrees from the perpendicular. Let it, furthermore, be supposed that the slide 28 and the smaller and upper eccentric 30 are omitted, the shaft 38 resting upon the eccentric 25. In this condition the machine would sharpen a saw having teeth one inch deep and three inches apart and no other. The front of the teeth would be tangent to an inner circle three-fifths the diameter of the saw and the back of the teeth would be slightly curved outward from a line drawn from point to gullet. All of these conditions may be changed as follows: Suppose a gullet is required more or less than an inch deep. It may be obtained by giving more or less throw to the eccentric 25. If it is required to grind a saw having teeth more or less than three inches apart, the result may be obtained by moving the block 57 along the scale-lever 58 to or from the fulcrum 63. If it is desired to change the cutting-angle of the front of the teeth, it may be accomplished by swinging the saw-table B' so that it stands more or less than thirty-eight degrees from the line of motion. Now suppose it is desirable to increase the curvature of the back of the teeth. The slide 28 and smaller eccentric 30 are added, as shown, and the friction between the shaft 38, which raises and lowers the saw, and the eccentric 25, which imparts motion to the shaft, will be reduced, provided the upper eccentric 30 revolves upon its center.

In the formation of the back of a tooth the saw follows the receding side of the eccentric 25 down and the shifting-lever 72 simultaneously rotates the saw one tooth. As the forward thrust of the lever 72 coincides with a half-revolution of the eccentric 25, so a one-quarter revolution of said eccentric corresponds to half the thrust of the lever 72, which brings the tooth in contact with the grinding-wheel at this stage half-way between the gullet and point. The upper eccentric 30 being one-half the diameter of the main eccentric 25 consequently makes a complete revolution while the main eccentric is performing a half one.

The smaller eccentric 30 is made to adjust eccentrically and its greatest side in contact with the greatest upward throw of the main eccentric 25. The eccentric 30 arrives at its small side when the main eccentric 25 has made one-fourth of a revolution and when the shifting-lever 72 has made half its thrust and the grinding-wheel is half-way from the gullet to the point. Consequently the saw has been allowed to drop away from the wheel at that point a distance equal to the throw of the eccentric 30 more than it would if said eccentric 30 were adjusted on its center. The next one-fourth revolution of the main eccentric 25 completes the down motion of the saw and brings the greatest side of the eccentric 30 in contact again. As the greatest side of the eccentric 30 is in contact when the grinding-wheel is in the gullet and at the point of the tooth and passes completely over its smallest side between these points, any arch or curve above a line drawn from gullet to the point may be formed by adjusting the eccentric more or less away from its center.

Having thus described my invention, I claim as new and desire to secure by Letters Patent—

1. In a saw-sharpening machine, the combination of a table, a chuck located upon the table, a drive-shaft, an eccentric mounted upon the said shaft, a second and smaller eccentric driven from the larger one, and a slide connected with the driven eccentric and controlling the movement of the said table, as and for the purpose specified.

2. In a saw-sharpening machine, the combination of a carrying-shaft having end movement, a table adjustably attached to the carrying-shaft, a chuck adjustable upon the said table and adapted for the support of the saw, a driving-shaft, an eccentric driven by the said driving-shaft, a slide arranged to support the carrying-shaft, and a smaller eccentric located on the slide and engaging with the eccentric driven from the driving-shaft, substantially as and for the purpose set forth.

3. In a saw-sharpening machine, the combination of a carrying-shaft having end movement, and comprising a hollow shaft and a shaft adjustable within the hollow shaft, a slide supporting the two shafts, a saw-carrying table adjustably attached to the hollow shaft, a driving-shaft, and an adjustable connection between the said shaft and the slide, the said connection being arranged to impart reciprocating movement to the carrying-shaft, substantially as described.

4. In a saw-sharpening machine, the combination of a carrying-shaft having end movement, and comprising a hollow shaft and a shaft adjustable within the hollow shaft, a slide supporting the carrying-shaft, a saw-carrying table adjustably attached to the hollow shaft, a driving-shaft, and an adjustable eccentric-gear connection between the driving-shaft and the said slide, as and for the purpose set forth.

5. In a saw-sharpening machine, the combination, of a carrying-shaft, comprising a hollow shaft and a shaft movable in the hollow shaft and extending beyond the ends of the same, a slide supporting the carrying-shaft, an adjustable saw-carrying table attached to the said carrying-shaft, a drive-shaft, eccentric-gears arranged to raise and lower the carrying-shaft, the said gears being of different diameters, and one of them being actuated from the driving-shaft and the other being connected with the slide, as and for the purpose specified.

6. In a saw-sharpening machine, the combination, of a carrying-shaft, comprising a hollow shaft having end movement and a shaft movable within the hollow shaft and extending beyond the ends of the same, a slide supporting the carrying-shaft, an adjustable saw-carrying table attached to the said carrying-shaft, a driving-shaft, an eccentric-gear driven from the said driving-shaft, an eccentric-pinion carried by the slide and meshing with the said eccentric-gear, and an adjustable clamp adapted for attachment to the periphery of the saw and attached to the carrying-shaft, as and for the purpose specified.

7. In a saw-sharpening machine, the combination, of a carrying-shaft comprising a hollow shaft and a shaft extending through the hollow shaft and projecting beyond the tubular section, a table provided with a scale and adjustably attached to the carrying-shaft, a chuck adapted to receive a saw and adjustable upon the said table, a slide supporting the carrying-shaft, a driving-shaft, an eccentric-gear attached to the said driving-shaft, an eccentric-pinion connected with the slide and meshing with the eccentric-gear, a clamp attached to the carrying-shaft, being arranged for engagement with the periphery of the saw, and a feed device actuated by the aforesaid eccentric-gearing, as and for the purpose specified.

8. In a saw-sharpening machine, the combination, of a shaft adapted to carry a saw, the said shaft being capable of end movement, a sliding support for the carrying-shaft, a driving-shaft, an eccentric connection between the driving-shaft and the said sliding support, a feed-bar, a lever provided with a scale, a second lever connected with the scale-lever and connected with the feed-bar, an adjustable slide having movement upon the scale-lever, an actuating-lever receiving movement from the eccentric-driving connection of the carrying-shaft, and a connecting-rod uniting the slide of the scale-lever with the said actuating-lever, as and for the purpose specified.

9. The combination, of a carrying-shaft for a saw and eccentrics arranged to impart end movement to the said carrying-shaft, an actuating-lever provided with a roller having a sliding bearing and normally held in engagement with the eccentric-actuating mechanism, a feed-bar for the saw, levers connected with the said feed-bar, a slide adjustable upon one of the said levers, a screw device for operating the slide, and a connection between the said slide and the actuating mechanism, as and for the purpose specified.

10. The combination, of the carrying-shaft for a saw, eccentrics arranged to impart end movement to the said carrying-shaft, an actuating-lever provided with a roller having a sliding bearing and normally held in engagement with the eccentric-actuating mechanism, a feed-bar adapted to actuate the saw, a scale-lever provided with a screw-actuated slide, a second lever having its fulcrum independent of the scale-lever and connected with the feed-bar, a tension device connecting the scale-lever and the lever attached to the feed-bar, and a link connection between the slide of the scale-lever and the said actuating-lever, as and for the purpose specified.

11. In a saw-sharpening machine, the combination with a frame having means for supporting the saw, of a feed-bar, a scale-lever, a second lever fulcrumed adjacent to the scale-lever and connected to the feed-bar, a yielding connection between the two levers whereby they move together, a slide adjustable on the scale-lever, a link connected to the slide, a lever fulcrumed to the frame and connected to the link, and means for swinging the last-named lever, substantially as described.

12. In a saw-sharpening machine, the combination with a frame, of a vertically-movable saw-support, a shaft, an eccentric on said shaft, a slide movable to reciprocate the support, an eccentric carried by the slide and engaging the eccentric on the shaft, a feed-bar, and means for transmitting movement from the eccentric on the shaft to the feed-bar, substantially as described.

13. In a machine for sharpening saws, the combination with a frame, of a slidable saw-support, a shaft, an eccentric on the shaft, the eccentric transmitting sliding movement to the support, a feed-bar, a lever connected with the feed-bar, a link transmitting movement to the lever, and a second lever connected to the link and operated by the eccentric, substantially as described.

14. In a saw-sharpening machine, the combination with a frame having means for carrying the saw, of a feed-bar, a lever connected to the feed-bar, a second lever fulcrumed adjacent to the first lever, a rod connected to each lever, a spring fixed to the rod and to one lever, and means for imparting movement to one lever, substantially as described.

15. In a saw-sharpening machine, the combination with a frame having means for carrying the saw, of a feed-bar, two levers one of which is connected to the feed-bar, a yielding connection between the two levers, and means for rocking one of the levers, substantially as described.

16. In a saw-sharpening machine, the combination with a frame having means for carrying the saw, of a feed-bar, two levers, one of which is connected to the feed-bar, a yielding connection between the two levers, a slide movable on the lever which is out of direct connection with the feed-bar, a link connected to the slide, and means for transmitting movement to the link, substantially as described.

17. In a saw-sharpening machine, the combination with a frame having means for carrying the saw, of a feed-bar, two levers, one of which is connected to the feed-bar, a slide movable on the remaining lever, a screw for moving the slide, a yielding connection between the two levers, and means for transmitting movement to the levers through the medium of the slide, substantially as described.

18. In a saw-sharpening machine, the combination with a frame having a sliding saw-carrier, of a slide reciprocating said carrier, a rotary shaft, an eccentric on said shaft, and a second eccentric carried by the slide, the two eccentrics engaging each other and each being adjustable to change the position of their axes, substantially as described.

19. In a saw-sharpening machine, the combination with a frame having a sliding saw-carrier, of a shaft, a disk provided with a radial slot through which the shaft passes, means for adjustably connecting the disk to the shaft at points throughout the slot, a slide reciprocating the saw-carrier, a disk mounted on the slide and having a radial slot, and means for securing the second disk to the slide at points throughout the slot, substantially as described.

20. In a saw-sharpening machine, the combination with a frame, of a slidable carrying-shaft, a table carried by the shaft, a saw-holding chuck held by the table, an arm rigidly fixed to the carrying-shaft and connected to the table, a plate pivoted to the arm and capable of engaging the saw to hold the same, and means for pressing the plate against the saw, substantially as described.

21. In a saw-sharpening machine, the combination with a frame, of a sliding carrying-shaft, a plate held by the shaft, a table adjustably connected to the plate, and a saw-carrying chuck adjustable on the table, substantially as described.

22. In a saw-sharpening machine, the combination with a frame, of a slidably-mounted hollow shaft, a shaft adjustable within the hollow shaft, a saw-carrier supported by the hollow shaft, a slide engaged by the shaft which is within the hollow shaft, and means for reciprocating the slide to impart a similar movement to the shafts, substantially as described.

23. In a saw-sharpening machine, the combination with a frame, of a hollow shaft, a saw-carrier held by the hollow shaft, a shaft having screw-threaded connection with the hollow shaft and extending through the hollow shaft, a slide engaged by the second shaft, a rotary shaft, and two eccentrics respectively connected to the rotary shaft and to the slide and imparting reciprocal movement to the slide, substantially as described.

24. In a saw-sharpening machine, the combination with a frame, of a slidable hollow shaft, a shaft passing through the hollow shaft and adjustable with relation thereto, a saw-carrier held by the hollow shaft, a slide engaging the shaft which is within the hollow shaft, an eccentric adjustable on the slide, a rotary shaft, and an eccentric adjustable on the rotary shaft and engaging the eccentric on the slide, substantially as described.

FRANK PARSONS.

Witnesses:
T. W. BOUCHILLON,
T. M. HARLESTON.